United States Patent
Takayama (10) Patent No.: US 10,044,794 B2
(45) Date of Patent: Aug. 7, 2018

(54) INFORMATION PROCESSING APPARATUS, COMMUNICATION SYSTEM, INFORMATION PROCESSING METHOD, AND NON-TRANSITORY COMPUTER READABLE MEDIUM

(71) Applicant: FUJI XEROX CO., LTD., Tokyo (JP)

(72) Inventor: Hideaki Takayama, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 414 days.

(21) Appl. No.: 14/615,488

(22) Filed: Feb. 6, 2015

(65) Prior Publication Data

US 2016/0094623 A1     Mar. 31, 2016

(30) Foreign Application Priority Data

Sep. 25, 2014  (JP) ................................ 2014-195061

(51) Int. Cl.
  *G06F 15/16*   (2006.01)
  *H04L 29/08*   (2006.01)
  *H04L 29/06*   (2006.01)

(52) U.S. Cl.
  CPC ............. *H04L 67/10* (2013.01); *H04L 63/02* (2013.01)

(58) Field of Classification Search
  USPC .................. 709/225, 203, 206, 223; 726/7, 3
  See application file for complete search history.

(56) References Cited

U.S. PATENT DOCUMENTS

| | | | | |
|---|---|---|---|---|
| 6,651,174 | B1 * | 11/2003 | Nagaoka | H04L 63/0263 709/239 |
| 8,959,588 | B1 * | 2/2015 | Vijayan | H04L 9/32 726/3 |
| 9,195,666 | B2 * | 11/2015 | Horn | G06F 17/30073 |
| 9,639,316 | B2 * | 5/2017 | Mizoguchi | G06F 3/1285 |
| 2002/0143922 | A1 * | 10/2002 | Tanimoto | H04L 29/06 709/223 |
| 2006/0095501 | A1 * | 5/2006 | Mochida | H04L 29/06027 709/203 |
| 2006/0095517 | A1 * | 5/2006 | O'Connor | H04L 51/38 709/206 |
| 2009/0265772 | A1 * | 10/2009 | Hitchcock | G06F 21/335 726/7 |
| 2013/0022292 | A1 * | 1/2013 | Miyagi | H04N 1/00145 382/286 |

(Continued)

FOREIGN PATENT DOCUMENTS

JP      11-338798 A      12/1999

OTHER PUBLICATIONS

Japanese Office Action, Serial No. 2014195061; dated May 22, 2018.

*Primary Examiner* — Tammy Nguyen
(74) *Attorney, Agent, or Firm* — Sughrue Mion, PLLC (57) ABSTRACT

An information processing apparatus includes a first communication section and a second communication section. The first communication section externally receives information indicating a communication method to be used in communication with a server apparatus, by using a predetermined communication method. The second communication section communicates with the server apparatus by using the communication method indicated by the information that has been received.

15 Claims, 4 Drawing Sheets

(56) References Cited

U.S. PATENT DOCUMENTS

| | | | | |
|---|---|---|---|---|
| 2013/0024570 A1* | 1/2013 | Mizoguchi | ............ | H04L 67/2819 |
| | | | | 709/225 |
| 2013/0139225 A1* | 5/2013 | Saito | ............ | G06F 21/608 |
| | | | | 726/4 |
| 2013/0144935 A1* | 6/2013 | Valdetaro | ............ | H04L 63/0281 |
| | | | | 709/203 |
| 2013/0314735 A1* | 11/2013 | Homma | ............ | H04N 1/00244 |
| | | | | 358/1.14 |
| 2014/0009776 A1* | 1/2014 | Suzuki | ............ | G06K 15/1807 |
| | | | | 358/1.13 |
| 2015/0370513 A1* | 12/2015 | Mizoguchi | ............ | G06F 3/1285 |
| | | | | 358/1.15 |
| 2016/0094623 A1* | 3/2016 | Takayama | ............ | H04L 67/10 |
| | | | | 709/203 |

\* cited by examiner

INFORMATION PROCESSING APPARATUS, COMMUNICATION SYSTEM, INFORMATION PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-195061 filed Sep. 25, 2014.

BACKGROUND

Technical Field

The present invention relates to an information processing apparatus, a communication system, an information processing method, and a non-transitory computer readable medium.

SUMMARY

According to an aspect of the invention, there is provided an information processing apparatus including a first communication section and a second communication section. The first communication section externally receives information indicating a communication method to be used in communication with a server apparatus, by using a predetermined communication method. The second communication section communicates with the server apparatus by using the communication method indicated by the information that has been received.

BRIEF DESCRIPTION OF THE DRAWINGS

Exemplary embodiments of the present invention will be described in detail based on the following figures, wherein.

DETAILED DESCRIPTION

Exemplary Embodiments

Figure 1:
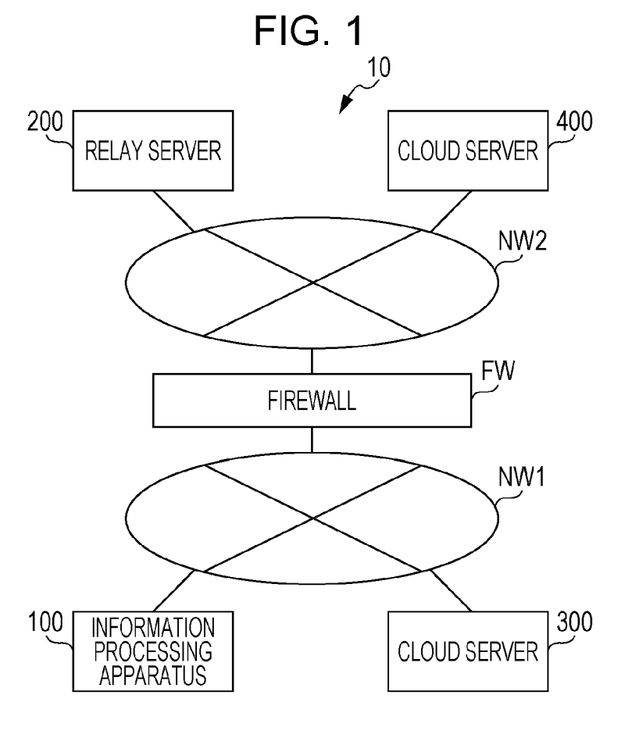
FIG. 1 is a block diagram illustrating a configuration of a communication system.

FIG. 1 is a block diagram illustrating a configuration of a communication system 10 according to an exemplary embodiment of the present invention. The communication system 10 is constituted by an information processing apparatus 100, a relay server 200, a cloud server 300, and a cloud server 400. The information processing apparatus 100 and the cloud server 300 are connected to a network NW1. On the other hand, the relay server 200 and the cloud server 400 are connected to a network NW2 that is different from the network NW1. The network NW1 and the network NW2 are connected to each other via a firewall FW. The firewall FW controls communication so as to allow communication that satisfies a specific condition and not to allow communication that does not satisfy a specific condition.

The network NW1 is an intranet, for example, which is an internal network of an enterprise or the like. On the other hand, the network NW2 is typically the Internet. That is, the network NW2 is an external network for the network NW1. Note that, to the network NW1 and the network NW2, other apparatuses not illustrated in FIG. 1 may be further connected.

The communication system 10 is a system for using plural cloud services via the information processing apparatus 100. Here, cloud services are services (Web services) provided by using cloud computing, and include services, such as data storage and provision of software associated with data storage. For example, an online storage service is an example of a cloud service described here. The cloud servers 300 and 400 are server apparatuses for providing cloud services. While the cloud servers 300 and 400 are each assumed to be a single server apparatus and description will be given, services may be realized by cooperation between plural server apparatuses.

Cloud services in this exemplary embodiment include a service provided in the internal network and a service provided in the external network, and the former service will be referred to as a "private cloud" and the latter service will be referred to as a "public cloud" hereinafter. The private cloud is a cloud service that is assumed to be used via the internal network and is a service available to specific users, such as employees of a specific enterprise. On the other hand, the public cloud is a cloud service that is assumed to be used via the external network and is a publicly available service, that is, a service available to unspecified users.

In this exemplary embodiment, a cloud service provided by the cloud server 300 is the private cloud, and a cloud service provided by the cloud server 400 is the public cloud. For both the private cloud and the public cloud, cloud services provided by plural providers may coexist in the same network and may be appropriately used depending on the purpose or use. That is, plural server apparatuses corresponding to the cloud server 300 or 400 may be provided in the same network.

The information processing apparatus 100 is a computer apparatus that transmits/receives data and performs a process on the data. In this exemplary embodiment, the information processing apparatus 100 is an image forming apparatus having functions, such as scanning, printing, copying, and the like.

Figure 2:
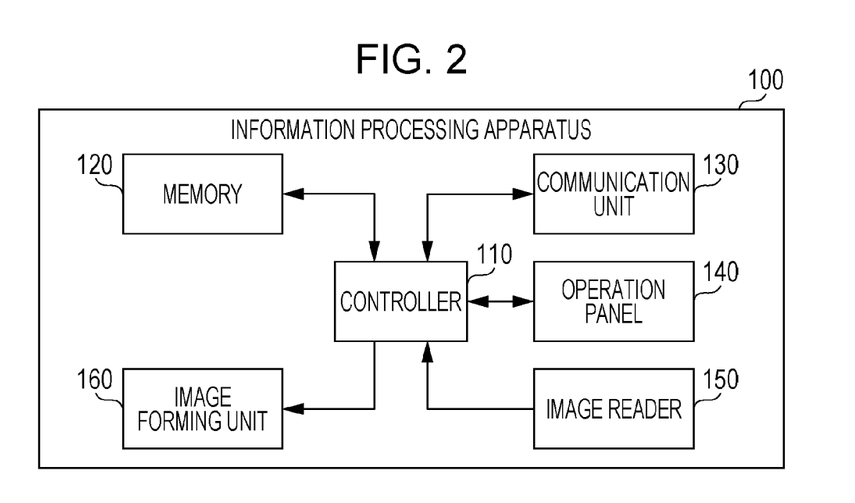
FIG. 2 is a block diagram illustrating a hardware configuration of an information processing apparatus.

FIG. 2 is a block diagram illustrating a hardware configuration of the information processing apparatus 100. The information processing apparatus 100 includes a controller 110, a memory 120, a communication unit 130, an operation panel 140, an image reader 150, and an image forming unit 160. The information processing apparatus 100 may further include a speaker, a buzzer, a lamp, or the like as a unit for communicating information to a user.

The controller 110 is a unit that controls operations performed by each unit in the information processing apparatus 100. The controller 110 includes an arithmetic processing unit, such as a central processing unit (CPU), and a memory and controls operations (transmission/reception of data, display of a screen, and the like) performed by each unit in the information processing apparatus 100 by executing a program.

The memory 120 is a unit that stores data. The memory 120 includes a hard disk and a semiconductor memory, for example, and stores data used by the controller 110. For example, the memory 120 stores data to be transmitted via the communication unit 130 and data received via the communication unit 130.

The communication unit 130 is a unit that transmits and receives data over the network NW1. The communication unit 130 is connected to the relay server 200 and the cloud server 300 over the network NW1 and transmits or receives data needed in communication. The communication unit 130 performs modulation and demodulation based on the communication scheme used by the information processing apparatus 100.

The operation panel 140 is a unit that accepts operations performed by a user and that provides a user with information. The operation panel 140 includes various keys or buttons and a display formed of a liquid crystal panel or the like. The display displays monochrome or color characters and images on the basis of a dot-matrix scheme, for example. Note that the operation panel 140 may be formed of a touchscreen display.

The image reader 150 is a unit that optically reads a document. The image reader 150 includes image sensors, such as charge coupled device (CCD) image sensors and generates image data that represents a document. The image reader 150 may be a flat-bed-type image reader that reads a document by moving the image sensors, a sheet-feed-type image reader that reads a document by moving the document while keeping the image sensors at the same position, or an image reader of another type.

The image forming unit 160 is a unit that forms (that is, visualizes) an image on the basis of image data. The image forming unit 160 forms an image on a sheet by using an electrophotographic system or a thermal transfer printing system, for example. Image data is generated by the image reader 150 or is received via the communication unit 130.

The relay server 200 is a server apparatus for relaying communication performed by the information processing apparatus 100. In a case where the information processing apparatus 100 accesses the cloud server 400, for example, the information processing apparatus 100 does not directly exchange data with the cloud server 400 but exchanges data via the relay server 200. The relay server 200 is an example of a relay apparatus according to the exemplary embodiment of the present invention.

Figure 3:
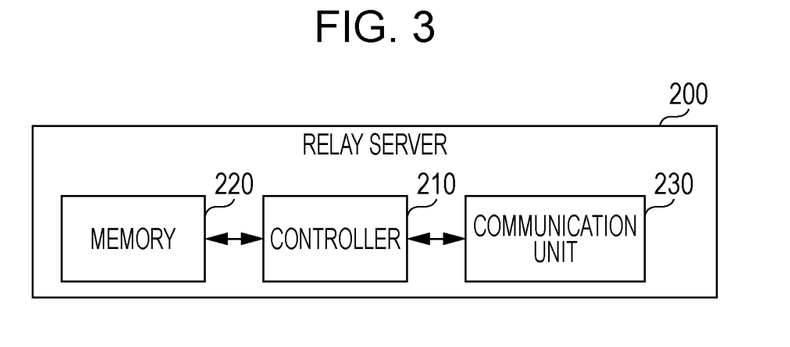
FIG. 3 is a block diagram illustrating a hardware configuration of a relay server.

FIG. 3 is a block diagram illustrating a hardware configuration of the relay server 200. The relay server 200 includes a controller 210, a memory 220, and a communication unit 230. The controller 210 is a unit that controls operations performed by each unit in the relay server 200. The controller 210 includes an arithmetic processing unit, such as a CPU, and a memory and controls operations (transmission/reception, recording, reading, and the like of data) performed by each unit in the relay server 200 by executing a program. The memory 220 is a unit that stores data, and stores information needed to access each cloud service (hereinafter referred to as "access information"). The communication unit 230 is a unit that transmits and receives data over the network NW2.

The access information is information used to access the cloud servers 300 and 400. The access information may be data of a different type depending on the access destination. The access information may be data described by using Web Services Description Language (WSDL), a program (a script, or the like) that is executable by an internal server, or a uniform resource locator (URL) that represents the location of the data or the program, for example.

The configuration of the communication system 10 is as described above. On the basis of the configuration, the information processing apparatus 100 performs a process that is linked to a cloud service. The information processing apparatus 100 forms an image on the basis of data stored by using a cloud service, or stores data obtained by scanning an original (a document or the like), by using a cloud service, for example.

The information processing apparatus 100 is unable to directly communicate with the public cloud for which the communication method is unknown. Accordingly, the information processing apparatus 100 accesses the public cloud via the relay server 200. The information processing apparatus 100 has an application programming interface (API) for accessing the relay server 200 and communicates with the relay server 200 using the API. In a case where the information processing apparatus 100 accesses a cloud service, the information processing apparatus 100 first accesses the relay server 200 regardless of whether the access destination is the public cloud or the private cloud.

The relay server 200 accesses the public cloud in response to a request made by the information processing apparatus 100. However, the relay server 200 is unable to directly access the private cloud because of the existence of the firewall FW. Therefore, the relay server 200 makes the information processing apparatus 100 access the relay server 200 by using the API, establish communication using a known communication method, and obtain the access information to thereby achieve direct access from the information processing apparatus 100 to the private cloud.

In a case where the information processing apparatus 100 accesses any of the public cloud and the private cloud, the information processing apparatus 100 performs access by using a common communication method for accessing the relay server 200 using the API. Accordingly, the information processing apparatus 100 need not know in advance a communication method for accessing each cloud service. That is, in this exemplary embodiment, it is sufficient that only the relay server 200 knows a communication method for accessing each cloud service.

Figure 4:
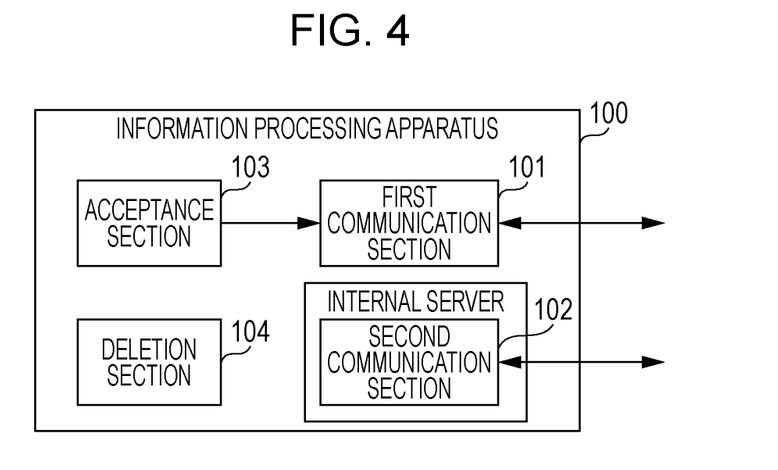
FIG. 4 is a block diagram illustrating a functional configuration relating to communication performed by the information processing apparatus.

FIG. 4 is a block diagram illustrating a functional configuration relating to communication performed by the information processing apparatus 100. The information processing apparatus 100 implements functions corresponding to a first communication section 101, a second communication section 102, an acceptance section 103, and a deletion section 104 by the controller 110 executing a program. Note that a program for implementing the functions may be application software or may be included in system software, such as an operating system (OS).

The acceptance section 103 is a section that accepts a use request for using a cloud service from a user. The acceptance section 103 accepts an operation performed by a user via the operation panel 140 to thereby accept a use request for using a cloud service. A use request for using a cloud service contains a parameter that indicates the type of process (service) to be performed and a parameter used to identify a cloud service to be used. Examples of the type of process described here include "printing", "scanning", and the like and may also include other operations on a file, such as copying, moving, and editing of a file. The parameter used to identify a cloud service may contain data that indicates whether the cloud service is the public cloud or the private cloud.

The first communication section 101 is a section that performs communication using the API. The first communication section 101 also has a function of receiving the access information by performing communication using the API. In this exemplary embodiment, the access information is stored in the relay server 200. Therefore, the first communication section 101 transmits/receives data to/from the relay server 200. The access information is an example of information that indicates a communication method to be used in communication with server apparatuses (the cloud servers 300 and 400).

The second communication section 102 is a section that communicates with server apparatuses (the cloud servers 300 and 400) in accordance with the access information. In a case where the first communication section 101 has received the access information from the relay server 200, the second communication section 102 communicates with the cloud server 300 or 400 by using the received access information. The second communication section 102 makes (part of) the information processing apparatus 100 function as a server apparatus (Web server) as appropriate to thereby transmit/receive data to/from the cloud server 300. The part of the information processing apparatus 100 that functions as a server apparatus will also be referred to as an "internal server" hereinafter. The internal server described here typically assigned an Internet Protocol (IP) address "127.0.0.1" (IPv4) and a host name "localhost".

Communication performed by the first communication section 101 specifically includes communication with the relay server 200 and communication with the cloud server 400 via the relay server 200. A communication method performed by the first communication section 101 is an example of a first communication method according to the exemplary embodiment of the present invention. The first communication method is a predetermined communication method and is known to the information processing apparatus 100. On the other hand, communication performed by the second communication section 102 includes inter-server communication performed between the cloud server 300 and the internal server (that is, communication performed without the relay server 200) and the like. A method of this communication is an example of a second communication method according to the exemplary embodiment of the present invention. The second communication method is a communication method not known to the information processing apparatus 100 and is known to the information processing apparatus 100 after the information processing apparatus 100 obtains the access information from the relay server 200.

The deletion section 104 is a section that deletes the access information. The deletion section 104 deletes the access information stored in a memory (the memory 120 or the like) as appropriate after use of a cloud service via the second communication section 102. In a case where the space available in the memory 120 decreases or in a case where a predetermined condition is satisfied, for example, the deletion section 104 deletes the access information.

Figure 5:
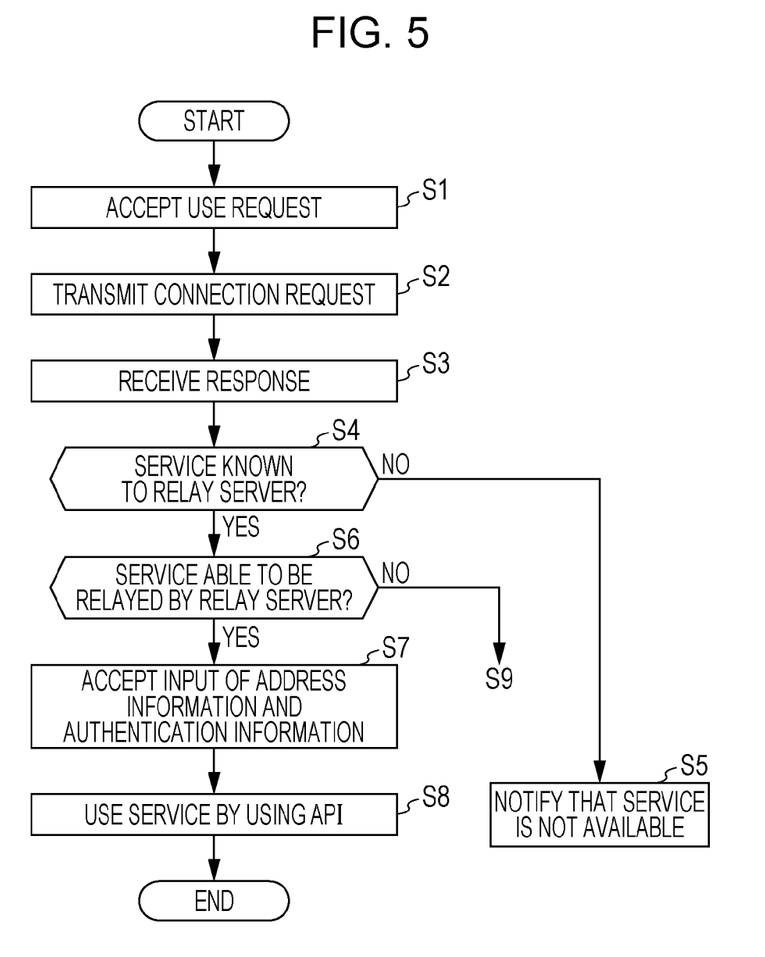
FIG. 5 is a flowchart illustrating an example of operations performed by the information processing apparatus.
Figure 6:
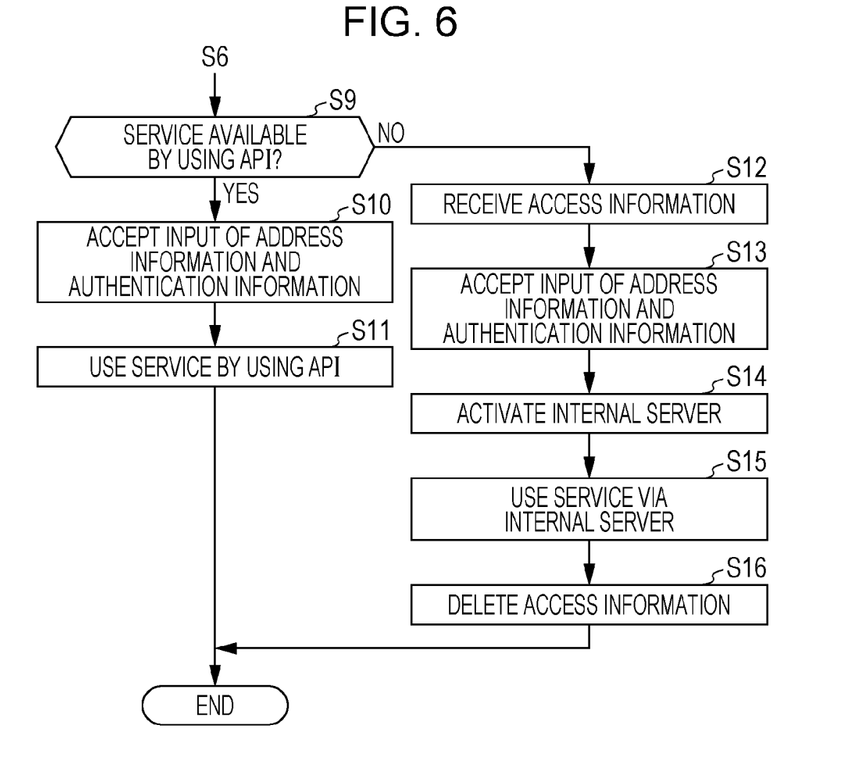
FIG. 6 is a flowchart illustrating an example of operations performed by the information processing apparatus.

FIGS. 5 and 6 are flowcharts illustrating an example of operations performed by the information processing apparatus 100 in a case of using a cloud service. A series of processes illustrated in FIGS. 5 and 6 is initiated when a user performs an operation for making a use request for using a specific cloud service (referred to as a "service A" here, for example). When the information processing apparatus 100 accepts the use request (step S1), the information processing apparatus 100 transmits to the relay server 200 a connection request for connection with the service A (step S2). The use request and the connection request each contain a parameter that indicates the type of process to be performed in the service A and a parameter used to identify the service A.

The information processing apparatus 100 thereafter receives a response to the connection request from the relay server 200 (step S3). The response contains information as to whether the service A is a service known to the relay server 200, as to whether the service A is able to be relayed by the relay server 200, as to whether the service A is able to be accessed using the API, and so on. That is, the response is an example of information that indicates a communication method to be used in communication with the server apparatus.

The information processing apparatus 100 determines whether or not the service A is a service known to the relay server 200, on the basis of the response transmitted from the relay server 200 (step S4). The known service described here is a service that is able to be used by using a communication method that is known. If the service A is not a service known to the relay server 200 (No in step S4), the information processing apparatus 100 notifies the user that the service A is not available (step S5). The information processing apparatus 100 gives notification by displaying a message indicating that the service A is not available on the operation panel 140 or making a predetermined buzzer sound.

On the other hand, if the service A is a service known to the relay server 200 (Yes in step S4), the information processing apparatus 100 determines whether or not the service A is a service that is able to be relayed by the relay server 200 (step S6). In a case where the service A is a service that is available by using the API, the relay server 200 determines that the service A is a service made available by the relay server 200 relaying the service A. In a case where the service A is the public cloud known to the relay server 200, for example, the service A is a service that is available via the relay server 200 by using the API. If the service A is a service that is able to be relayed by the relay server 200 (Yes in step S6), the information processing apparatus 100 accepts input of address information for accessing the server apparatus (for example the cloud server 400) that provides the service A and authentication information (a user name, a password, and the like) needed for access (step S7), and uses the service A via the relay server 200 by using the API (step S8). The use described here is scanning or printing of an image, for example, and further includes downloading and uploading of image data.

If the service A is a service that is unable to be relayed by the relay server 200 (No in step S6), the information processing apparatus 100 performs processes illustrated in FIG. 6. Determination performed in step S6 results in a negative consequence (No) in a case where the service A is the private cloud. In this case, the information processing apparatus 100 determines whether or not the service A is a service available by using the API (step S9). If the service A is a service available by using the API (Yes in step S9), the information processing apparatus 100 accepts input of address information and authentication information as in step S7 (step S10), and uses the service A by using the API (step S11).

Note that the process in step S11 is similar to the process in step S8 in that the API is used; however, is different from the process in step S8 in that the service A is used without the relay server 200 in step S11. That is, in step S11, the information processing apparatus 100 directly accesses the server apparatus (for example, the cloud server 300) that provides the service A without relaying by the relay server 200.

On the other hand, if the service A is not a service available by using the API (No in step S9), the information processing apparatus 100 receives the access information from the relay server 200 (step S12). Furthermore, the information processing apparatus 100 accepts input of address information and authentication information as in step S7 (step S13). The information processing apparatus 100 thereafter activates the internal server (step S14) and uses the service A via the internal server by using the received access information (step S15). In a case where the information processing apparatus 100 uses the service A by using the access information, the information processing apparatus 100 deletes the access information after using the service A (step S16).

Modifications

Exemplary embodiments of the present invention are not limited to the exemplary embodiment described above. The present invention may be implemented according to aspects described below, for example. Alternatively, the present invention may be implemented by combining the above-described exemplary embodiment with one or plural modifications.

(1) Exemplary embodiments of the present invention are not limited to an exemplary embodiment in which both the public cloud and the private cloud are used. Therefore, exemplary embodiments of the present invention do not necessarily use plural different networks or do not necessarily use a firewall.

Figure 7:
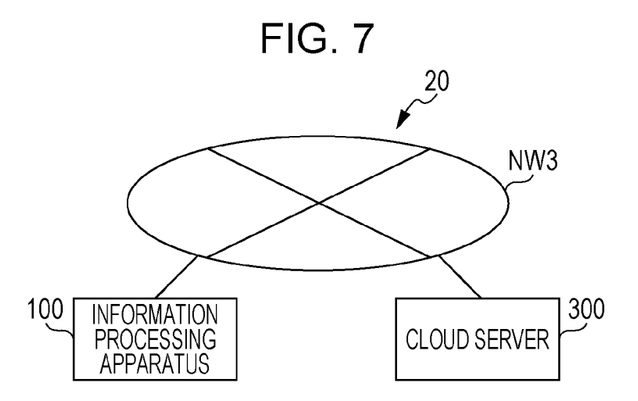
FIG. 7 is a block diagram illustrating a configuration of a communication system.

FIG. 7 is a block diagram illustrating a configuration of a communication system 20 according to another exemplary embodiment of the present invention. The communication system 20 includes the information processing apparatus 100 and the cloud server 300 similar to those in the above-described exemplary embodiment, and the information processing apparatus 100 and the cloud server 300 are connected to each other over a network NW3. Here, the network NW3 may be the Internet or an intranet. A cloud service provided by the cloud server 300 may be the public cloud or the private cloud. It is assumed that a cloud service provided by the cloud server 300 is a service for which the communication method is unknown to the information processing apparatus 100.

In this example, the information processing apparatus 100 communicates with the cloud server 300 by using the API and receives information for accessing the cloud service. The information processing apparatus 100 thereafter accesses the cloud service by using a communication method based on the received information. In doing so, relaying by the relay server 200 is not needed unlike in the case of the above-described exemplary embodiment.

(2) Operations performed by the information processing apparatus 100 in a case of using a cloud service are not limited to those illustrated in FIGS. 5 and 6. For example, the access information need not necessarily be deleted. In this case, the process in step S16 is not performed. Address information and authentication information need not be input in the illustrated stage (that is, step S7, S10, or S13) and may be input in advance.

Note that, in a case where the access information is not deleted, the information processing apparatus 100 determines whether or not the information processing apparatus 100 already has the access information corresponding to a cloud service when accepting a use request for using the service. If the information processing apparatus 100 already has the access information, the information processing apparatus 100 may use the access information without receiving the information from the relay server 200.

(3) The information processing apparatus according to the exemplary embodiments of the present invention is not limited to an image forming apparatus. The present invention may be embodied in other forms, that is, as a communication system that includes the information processing apparatus (and the relay apparatus), a communication method, a non-transitory computer readable medium that stores a program for making a computer function as the information processing apparatus according to the exemplary embodiments of the present invention, and the like. The program may be stored in a non-transitory computer readable medium, such as an optical recording medium or a semiconductor memory, and may be provided from the medium. The program may be made available by being downloaded to the information processing apparatus by communication, such as the Internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
    at least one hardware processor configured to implement:
        a first communication section that externally receives information indicating a communication method to be used in communication with a server apparatus, by using a predetermined communication method; and
        a second communication section that communicates with the server apparatus by using the communication method indicated by the information that has been received, wherein
    the first communication section receives the information from a relay apparatus, and
    in a case in which the relay apparatus is not configured to relay a service between the second communication section and the server apparatus according to the information, the second communication section transmits a request for the service to the server without transmitting the request to the relay apparatus, the request being transmitted according to the communication method indicated by the information received from the relay apparatus.

2. The information processing apparatus according to claim 1, wherein
    the second communication section communicates with the server apparatus by using the communication method without using the relay apparatus, in accordance with the information that has been received.

3. The information processing apparatus according to claim 2, wherein
    the relay apparatus is connected to a communication network different from a communication network to which the information processing apparatus is connected, and
    the first communication section communicates with the relay apparatus via a firewall.

4. The information processing apparatus according to claim 1, wherein
the server apparatus is connected to a communication network different from a communication network to which the information processing apparatus is connected, and
the second communication section communicates with the server apparatus via a firewall.

5. The information processing apparatus according to claim 1, wherein the at least one hardware processor is further configured to implement:
an acceptance section that accepts a use request for using a service from a user, wherein
the first communication section receives the information corresponding to a server apparatus that provides a service indicated in the use request.

6. The information processing apparatus according to claim 1, wherein
the second communication section performs communication by using the information and making the information processing apparatus function as a server apparatus.

7. The information processing apparatus according to claim 1, wherein the at least one hardware processor is further configured to implement:
a deletion section that deletes the information from a memory after using a service provided by the server apparatus.

8. A communication system comprising:
the information processing apparatus according to claim 1; and
a server apparatus.

9. A communication method comprising:
externally receiving information indicating a communication method to be used in communication with a server apparatus, by using a predetermined communication method; and
communicating with the server apparatus by using the communication method indicated by the information that has been received, wherein
the information is received from a relay apparatus, and
in a case in which the relay apparatus is not configured to relay a service between an information processing apparatus and the server apparatus according to the information, the information processing apparatus transmits a request for the service to the server without transmitting the request to the relay apparatus, the request being transmitted according to the communication method indicated by the information received from the relay apparatus.

10. A non-transitory computer readable medium storing a program causing a computer to execute a process for information processing, the process comprising:
externally receiving information indicating a communication method to be used in communication with a server apparatus, by using a predetermined communication method; and
communicating with the server apparatus by using the communication method indicated by the information that has been received, wherein
the information is received from a relay apparatus, and
in a case in which the relay apparatus is not configured to relay a service between an information processing apparatus and the server apparatus according to the information, the information processing apparatus transmits a request for the service to the server without transmitting the request to the relay apparatus, the request being transmitted according to the communication method indicated by the information received from the relay apparatus.

11. The information processing apparatus according to claim 1, wherein in the case, the information directs the information processing apparatus whether to attempt access to the server through an application programming interface (API) of the information processing apparatus, and
in the case and in response to an indication that the API is not configured to relay the service between the second communication section and the server apparatus according to the information, the second communication section is further configured to activate an internal server of the information processing apparatus and to transmit the request for the service to the server through the internal server without transmitting the request through the relay apparatus and without transmitting the request through the API.

12. The information processing apparatus according to claim 11, wherein the first communication section is configured to request the information from the relay apparatus by transmitting a request indicating a type of process to be performed by the service and an identification of the service, and
the information received from the relay apparatus comprises indications
(a) whether the service is known to the relay apparatus,
(b) whether the relay apparatus is configured to relay the service between the second communication section and the server apparatus, and
(c) in a case in which the relay apparatus is not configured to relay the service between the second communication section and the server apparatus, whether the service is configured to be accessed by the API.

13. The information processing apparatus according to claim 1, wherein, in the case, the server is a public server.

14. The information processing apparatus according to claim 1, wherein the information comprises a uniform resource locator (URL) to a location at which the service may be accessed.

15. The information processing apparatus according to claim 1, wherein the information indicates whether the relay apparatus is configured to relay the service between the second communication section and the server apparatus.

* * * * *